United States Patent
Benedict et al.

(10) Patent No.: US 11,899,777 B2
(45) Date of Patent: *Feb. 13, 2024

(54) MEMORY MODULE AUTHENTICATION EXTENSION

(71) Applicant: HEWLETT PACKARD ENTERPRISE DEVELOPMENT LP, Spring, TX (US)

(72) Inventors: Melvin K. Benedict, Magnolia, TX (US); Eric L. Pope, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,735

(22) Filed: Mar. 7, 2023

(65) Prior Publication Data

US 2023/0222203 A1 Jul. 13, 2023

Related U.S. Application Data

(63) Continuation of application No. 16/870,063, filed on May 8, 2020, now Pat. No. 11,609,980.

(51) Int. Cl.
*G06F 12/00* (2006.01)
*G06F 21/44* (2013.01)
(Continued)

(52) U.S. Cl.
CPC .......... *G06F 21/44* (2013.01); *G06F 13/1668* (2013.01); *G06F 13/4282* (2013.01)

(58) Field of Classification Search
CPC .. G06F 21/44; G06F 13/1668; G06F 13/4282; G06F 21/78; G06F 11/2205; G06F 21/602
See application file for complete search history.

(56) References Cited

U.S. PATENT DOCUMENTS

| 9,940,146 B2 | 4/2018 | Bieswanger et al. |
| 10,587,421 B2 | 3/2020 | Hojsik et al. |

(Continued)

FOREIGN PATENT DOCUMENTS

| CN | 101042682 A | 9/2007 |
| CN | 101297534 A | 10/2008 |
| CN | 105354121 A | 2/2016 |

OTHER PUBLICATIONS

DMTF, "Security Protocol and Data Model (SPDM) Specification", Version: 0.99.0a, Jul. 18, 2019, pp. 1-58.
(Continued)

*Primary Examiner* — John A Lane
(74) *Attorney, Agent, or Firm* — Trop, Pruner & Hu, P.C.

(57) ABSTRACT

Systems and methods are provided for a secondary authentication of a memory module. A nonce key is written to a nonce register of a register array on the memory module, the nonce register being accessible over two different interfaces. In various embodiments, the nonce key may be generated by a management system of the computing platform after performing one or more authentication processes for a memory module over a management interface. Authentication information for use in performing authentication can be stored in an identification component on the memory module. If authentication is successful, the management system can generate the nonce key and write it to the nonce register. Upon receiving a request to access an address, a memory controller can read the nonce register of the memory module at the requested address and compare the nonce key to an identifier included in the request.

20 Claims, 6 Drawing Sheets

(51) Int. Cl.
*G06F 13/42* (2006.01)
*G06F 13/16* (2006.01)

(56) References Cited

U.S. PATENT DOCUMENTS

| | | |
|---|---|---|
| 2007/0101401 A1 | 5/2007 | Genty et al. |
| 2007/0221724 A1 | 9/2007 | Kanai et al. |
| 2009/0041252 A1 | 2/2009 | Hanna |
| 2011/0314346 A1 | 12/2011 | Vas et al. |
| 2014/0281539 A1 | 9/2014 | Faltyn et al. |
| 2017/0075699 A1 | 3/2017 | Narayanan et al. |
| 2018/0054309 A1 | 2/2018 | Campagna |
| 2018/0205560 A1 | 7/2018 | Park et al. |
| 2018/0288050 A1 | 10/2018 | Chen et al. |
| 2019/0286804 A1 | 9/2019 | Chacko et al. |
| 2019/0303226 A1 | 10/2019 | Kim et al. |
| 2019/0340141 A1 | 11/2019 | Patel et al. |
| 2019/0370501 A1 | 12/2019 | Awan et al. |
| 2020/0119929 A1 | 4/2020 | Edwards et al. |
| 2020/0134163 A1 | 4/2020 | Courtney et al. |
| 2021/0349836 A1 | 11/2021 | Benedict et al. |
| 2021/0349985 A1 | 11/2021 | Benedict et al. |

OTHER PUBLICATIONS

Rambus, "LabStation Validation Platform", Interface IP, available online at <https://www.rambus.com/interface-ip/ddrn-phys/labstation-validation-platform/>, retrieved on Jun. 8, 2020, 6 pages.

MEMORY MODULE AUTHENTICATION EXTENSION

DESCRIPTION OF RELATED ART

Serial presence detect (SPD) is a standardized approach for accessing information within a memory module of a computing platform. During power-on of the computing platform, SPD enables the system to identify the memory modules present, as well as the configuration parameters for the memory module. An SPD hub is a hardware storage component of each memory module that stores all configuration information and parameters required for that memory module to operate on the platform. The central processing unit (CPU) of the computing system accesses this information during power-on to configure the platform to allow memory access.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
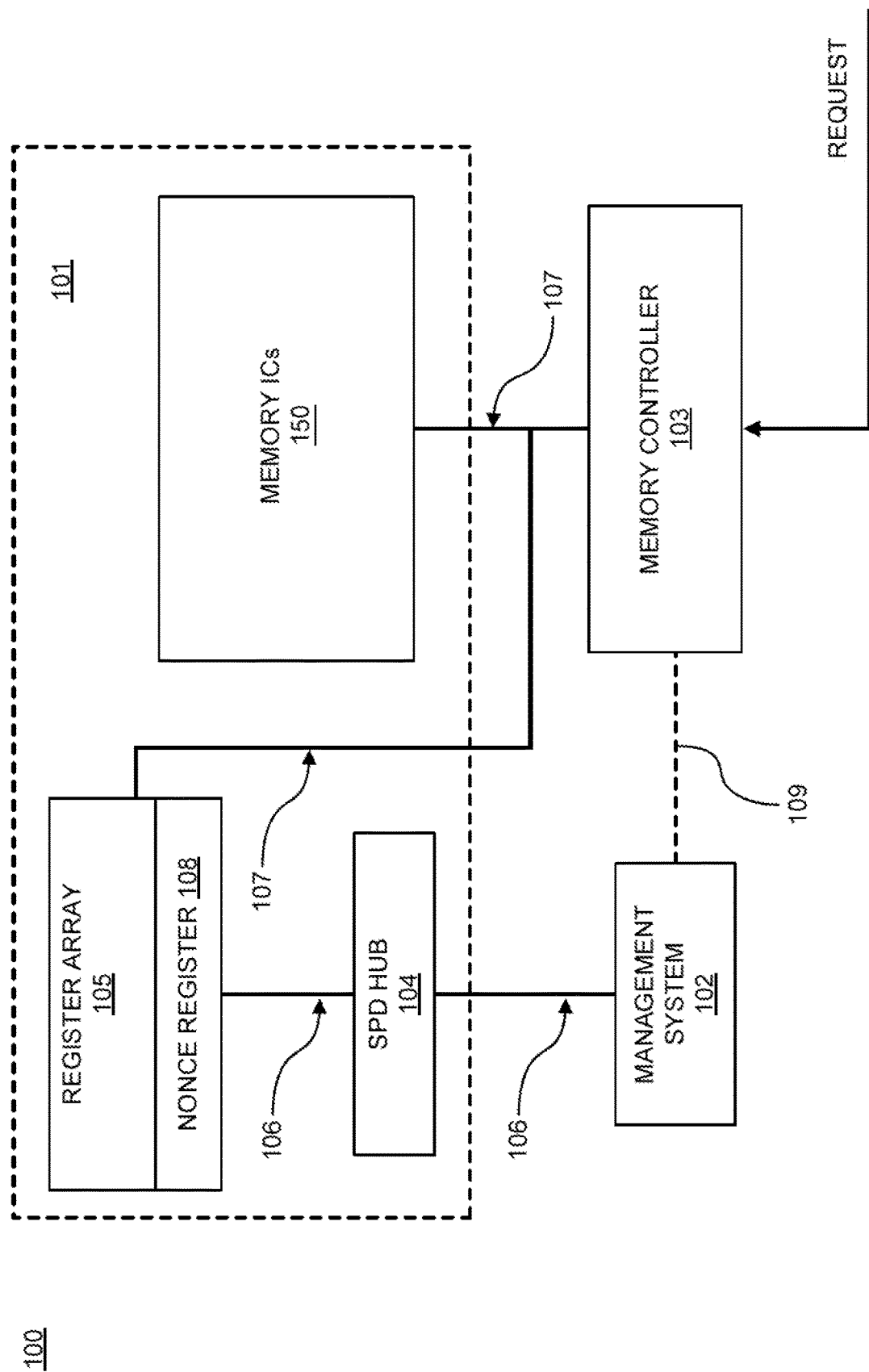
FIG. 1 is an example computing platform in accordance with embodiments of the technology disclosed herein.

The figures are not exhaustive and do not limit the present disclosure to the precise form disclosed.

DETAILED DESCRIPTION

Across the IT industry, there has been a movement to authenticate all of the components on a platform. Attackers can utilize the components attached to a platform to disrupt service, steal data, or destroy physical infrastructure, among other types of attacks. Such attacks can be mounted by substituting authentic components (i.e. memory modules or devices therein) with counterfeit versions, whether switched through the supply chain, during system assembly, or through post-deployment replacement on site. By replacing authentic components with counterfeits, attackers are capable of compromising the firmware of the system, rendering the operating system defenses ineffective. These backdoors can remain undetected.

As technology continues to advance, new generations of hardware components are being designed with authentication in mind. As a non-limiting example, next generation memory modules are moving towards including authentication information on the module. Using the SPD hub, authentication sequences or certificates can be stored on the memory module, which may be accessed by the platform's management controller to authentic the module. During power-on, the management controller can look for the authentication information included in the SPD hub and execute an authentication process to ensure that the memory module connected to the platform is authentic and not a counterfeit device. Once authenticated, the management controller configures the memory module and the system so that a user or application may access and/or write data to the memory module.

However, the introduction of next generation memory modules brings along a disconnect between the speed of the management interface utilized to perform authentication and the memory interface used by the memory module for data communication. Next generation memory modules utilize high-speed interface standards to enable applications to access the memory module, including but not limited to, DDRx (double Data Rate version x) or NVM Express (NVMe), among others. Platform management interfaces generally use slower communication interfaces, such as $I^2C$, I3C, or PCIe. This difference raises the issue of validating that the module addressed on the high-speed interface is the same as the module validated over the slower management interface.

Embodiments of the present disclosure provides a system and method of hardware module authentication that ensures the addressed hardware module is the same as the validated hardware module. As discussed below, each hardware module connected to a computing platform includes an identification component storing authentication information for the hardware module. In various embodiments, the identification component can comprise the SPD hub or other configuration data storage device of the hardware module. A management system of the platform communicatively coupled to the identification component of the hardware module over the management interface can retrieve the authentication information and perform authentication. In some embodiments, the management system can comprise a management controller of the platform system, while in other embodiments a dedicated management system can be included within the computing platform. Upon authentication, the management system can generate a nonce key and write the nonce key to a nonce register of the identification component of the hardware module. A nonce is a number (either random or assigned) that is only used once. In various embodiments, the nonce register can be a dedicated register of a register array, wherein in other embodiments the nonce register can comprise an error register. Each request to access a hardware module from the platform includes a value representing the nonce key randomly generated by the management system during authentication. When a module controller receives an access request over the memory interface, the module controller can retrieve the random nonce key from a nonce register of the hardware module at the address, and compare the retrieved nonce key against the value within the request. If the module controller determines the two values match, the access request can be allowed by the requesting application. If the values do not match, the module controller can deny the request. In various embodiments the module controller can return an error message or other indication that the request was denied. In some embodiments, the module controller can send an indication to the management system and/or a central processing unit (CPU) of the platform indicating the unvalidated hardware module or raising a flag as to the unvalidated hardware module. Additional aspects of the technology shall be discussed with respect to the embodiments identified below.

FIG. 1 illustrates an example computing platform 100 in accordance with the technology disclosed herein. The example platform 100 is provided for illustrative purposes only and should not be interpreted as limited to only the depicted embodiment. For ease of discussion, the technology of the present disclosure shall be discussed with respect to authentication of a memory module 101. However, the technology disclosed herein is applicable for authentication of any hardware module that may be connected to a computing platform over two interfaces (e.g. management interface and data interface), including but not limited to processors, interface cards, graphics processors, replaceable power units (RPUs), NVMe storage drives, add-in printed circuit boards (PCBs) (e.g., PCIe expansion cards), and switches among others. As shown in FIG. 1, the computing platform 100 can include a management system 102, a memory controller 103, and a memory module 101 comprising an SPD hub 104, a register array 105, and a plurality of memory integrated circuits (ICs) 150. In various embodiments, the computing platform 100 can comprise one or more of a server, a router, a switch, a gateway device, or other device within a network.

In various embodiments, the management system 102 can be configured to manage the operations of the computing platform 100. Non-limiting examples of the management system 102 include the baseboard management controller (BMC), unique security processor, a central processing unit (CPU), an application specific integrated circuit (ASIC), a field programmable gate array (FPGA), a complex programmable logic device (CPLD), a programmable logic array (PLA), among other processing circuits known in the art. In various embodiments, the management system 102 can be configured to perform one or more authentication processes. Authentication processes can include, but not limited to, a standardized authentication process known in the art, a proprietary authentication process of the computing platform 100, or a combination of both. The authentication processes may be implemented by the execution of non-transitory machine-readable instructions by the management system 102. In various embodiments, the management system 102 can include a dedicated authentication controller configured to execute the one or more authentication processes.

During the power-on sequence, the management system 102 can detect the presence of the memory module 101 over a management interface 106. In various embodiments, the memory module 101 can comprise one or more types of memory modules known in the art, including but not limited to single in-line memory modules (SIMMs), dual in-line memory modules (DIMMs), FLASH memory modules, among others. In some embodiments, the memory module 101 can comprise a high-speed interface for data, while in other embodiments the data interface (i.e., the memory interface 107) of the memory module 101 can comprise a similar interface as the management interface 106. Although the technology disclosed herein are designed to enable more secure hardware module authentication where there is a speed difference between the management and data interfaces, it is equally applicable where the difference in speed between the interfaces are small or negligible. Non-limiting examples of management interfaces 106 are I²C, I3C, PCI, PCIe, system management bus, among other bus interfaces used in computing platforms similar to computing platform 100 for management communication. In some embodiments, the management interface 106 may comprise an out-of-band management interface.

The memory module 101 can further include an identification component communicatively coupled to the management system 102 over a management interface 106. The identification component can comprise a storage chip configured to store configuration information related to a hardware module. In the depicted embodiment, the identification module comprises the SPD hub 104 of the memory module 101. The SPD hub 104 can comprise a storage chip disposed on the memory module 101 and configured to maintain identifying information for the memory module 101, including but not limited to configuration parameters for the memory module 101, including the memory ICs 150. In various embodiments, one or more memory ICs 150 can be disposed on the memory module 101. Each memory IC 150 comprises a memory circuit configured to store bits of information. To enable the platform to properly access the memory module 101, the management system 102 can retrieve configuration parameters from the SPD hub 104 over the management interface 106, and use that information to configure the computing platform 100 and the memory module 101. In various embodiments, the SPD hub 104 may further be configured to may maintain authentication information for the memory module 101. In some embodiments, the identification component may comprise a separate chip from the SPD hub 104, the separate storage chip (not shown in FIG. 1) communicatively coupled to the management system 102 over the management interface 106. In hardware modules where the SPD hub 104 is not present, an identification component can be included containing the authentication information for the hardware module, including but not limited to a register or media controller. In various embodiments, the memory module 101 can comprise one or more of DRAM, FLASH memory, solid state storage (SSD), hard disk drives (HDDs), or other storage devices.

During the authentication process, the management system 102 can access the authentication information through the SPD hub 104. Upon validating that the memory module 101 is an authentic module, the management system 102 can generate a random nonce value to serve as a unique nonce key to identify the memory module 101 in various embodiments. Each nonce key can comprise a suitable number of bits to provide a desired level of confidence that the nonce key is unique to identify that hardware module. In various embodiments, a plurality of confidence levels may be implemented, with each confidence level increasing the number of bits used for the nonce key. As a non-limiting example, a high confidence level may comprise 32 or more bits for the nonce key, whereas a low confidence level may comprise 24 of fewer bits for the nonce key. In various embodiments, the determination of the suitable number of bits may be determined based on a bit size of the nonce register. The management system 102 can cause the random nonce key to be stored within a nonce register 108 of the register array 105. The register array 105 can be a register component associated with the SPD hub 104, while in other embodiments the register array 105 may comprise one of the memory ICs 150 can configured to maintain information concerning the memory module 101. The nonce register 108 can comprise a dedicated entry within the register array 105 in some embodiments, while the nonce register 108 may comprise an error register of the register array 105. Storing the nonce key in the nonce register 108 provides a unique identifier for the memory module 101 that can be used for secondary authentication before allowing an access request. That is, using the nonce key enables a two-factor verification type validation method for hardware component authentication. Therefore, confidence that the addressed memory module is the authenticated memory module is increased.

In various embodiments, the computing platform 100 further includes a memory controller 103 configured to control access to the memory ICs 150 of the memory module 101. In some embodiments, each memory module 101 may have an associated memory controller 103, while in other embodiments a single memory controller 103 may be configured to control access to all the memory connected to the computing platform 100. In some embodiments, the memory controller 103 can comprise a dedicated device communicatively coupled to the computing platform 100, an integrated circuit of the computing platform 100, and/or a part of the CPU of the computing platform 100. The memory controller 107 can be communicatively coupled to the memory ICs 150 over a memory interface 107. In various embodiments, the memory interface may comprise one or more high speed interfaces, including but not limited to NVMe, DDRx, SPI, eSPI, among others. In various embodiments, the memory interface 107 may comprise a logical device interface.

The memory controller 103 may also be communicatively coupled to the register array 105 over the memory interface 107. In this way, the memory controller 103 is capable of reading one or more entries within the register array 105, including but not limited to the nonce register 108. In some embodiments, the memory controller 103 may be configured to read from and/or write to the nonce register 108. When the memory controller 103 receives an access request from an application, the memory controller 103 can first read the value stored within the nonce register 108 of the memory module 101 requested by the application. Within each request for access, an identification value can be included that is the same length as the expected nonce key. The memory controller 103 can compare the value within the request against the nonce key pulled from the nonce register 108 of the requested memory module 101. If the two values match, the memory controller 103 can determine the memory module requested is the same memory module 101 that was authenticated by the management system 102. If the values do not match, the memory controller 103 can determine that the connected memory module 101 is not the same memory module 101 that was authenticated by the management system 102.

Using the technology disclosed herein, the management system 102 enables a method of secondary authentication without impacting the overall performance of the computing platform 100, similar to two-factor authentication utilized for account access (e.g., mobile banking). By placing the nonce key in a nonce register 108 accessible over two interfaces (i.e., the management interface 106 and the memory interface 107), embodiments discussed herein enables validation regarding the identity of the addressed memory module 101. Accordingly, validation that the memory module 101 is the same component that was authenticated by the management system 102 can occur at the speed of the memory interface 107 and for each access request. Moreover, this functionality can increase the confidence the hardware module (here, the memory module 101) has not been tampered with between when the authentication occurred and the access request was received.

In various embodiments, the management system 102 can reauthenticate the memory module 101 while the computing platform 100 is operating. Continued authentication can be used to add a further level of security. Each authentication results in generation of a new nonce key, which is then written over the previous nonce key in the nonce register 108. In this way, even if an attacker was able to obtain the nonce key from a previous authentication, the continuous authentication would limit the effectiveness of such attempted attacks. In various embodiments, the management system 102 can be configured to periodically perform an authentication function on the memory module 102, generate a new nonce key, and store the new nonce key in the nonce register 108 of the memory module 101. In other embodiments, the management system 102 can be configured to conduct the authentication function at random intervals. In various embodiments, the memory controller 103 and the management system 102 may optionally be communicatively coupled over a controller management interface 109. In various embodiments, the controller management interface 109 and the management interface 106 can be coupled to the same communication bus of the computing platform 100 such that a single connection is required between the management system 102 and the communication bus (e.g., $I^2C$, I3C, etc.).

Figure 2:
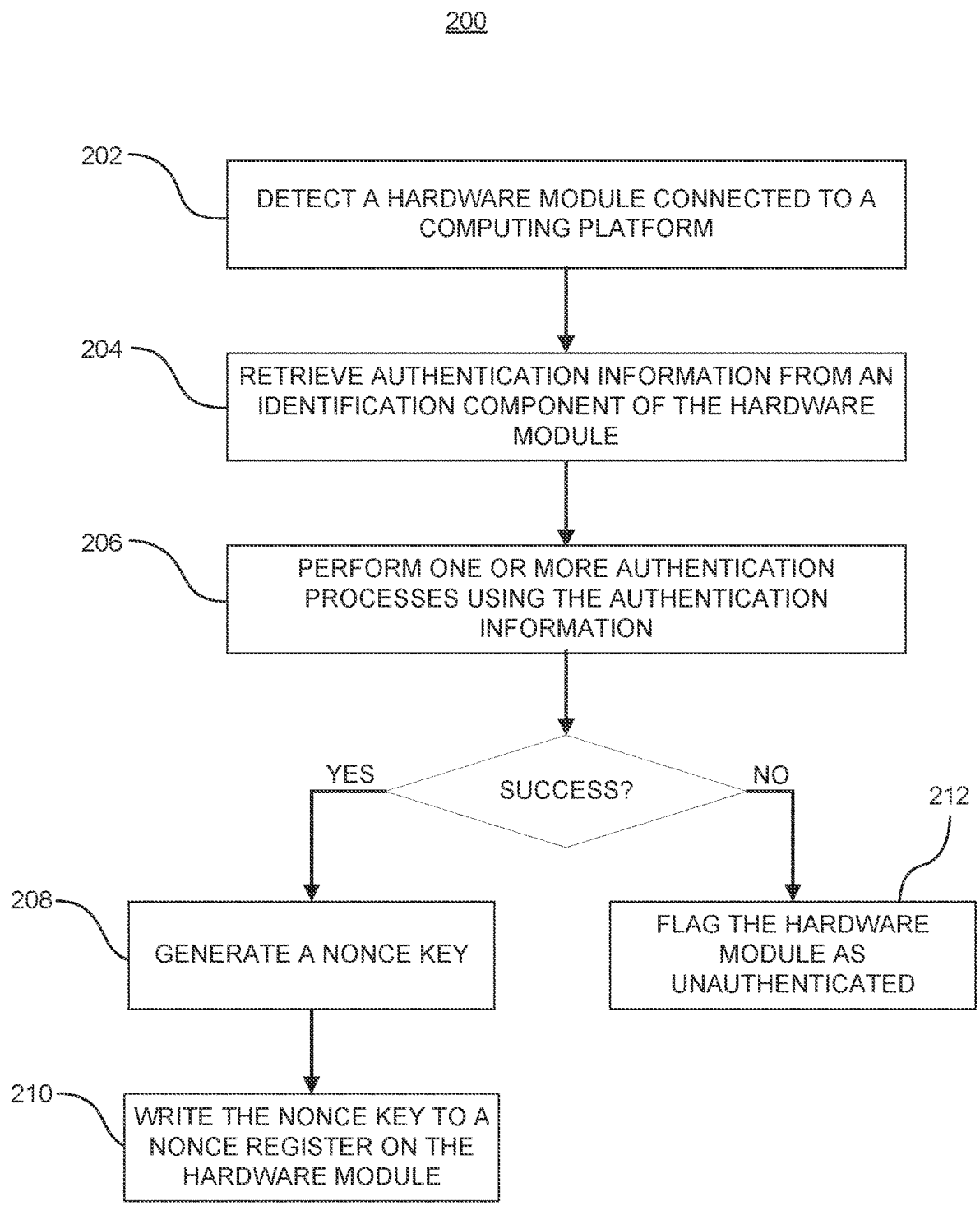
FIG. 2 is an example method in accordance with embodiments of the technology disclosed herein.

FIG. 2 illustrates an example method 200 in accordance with the technology disclosed herein. The example method 200 is provided for illustrative purposes only and should not be interpreted as limiting the scope of the technology to only the depicted embodiment. The example method 200 provides a method of authenticating hardware modules connected to a computing platform, such as the computing platform 100 discussed with respect to FIG. 1. In various embodiments, the method 200 can be executed by a management system of a computing platform, similar to the management system 102 discussed with respect to FIG. 1. The method 200 may comprise executing a set of instructions stored in a non-transitory machine-readable storage medium by one or more processing circuits of the management system. As shown in FIG. 2, a management system can detect a hardware module connected to a computing platform at operation 202. The hardware module may comprise one of a plurality of hardware components, including but not limited to memory modules, expansion cards, power supplies, among others. The management system can detect the presence of a hardware module based on one or more sensors configured to detect if a hardware component is inserted into a component slot of the computing platform, detection of one or more signals on a management interface, receiving a response to a ping sent by the management system, or a combination thereof. In some embodiments, a standardized detection protocol may be used, including but not limited to serial presence detect (SPD), parallel presence detect (PPD), FRU EEPROM, MCTP binding protocol, among others.

At operation 204, the management system can retrieve authentication information maintained in an identification component of the detected hardware module. Each hardware module can include one or more identification components configured to store one or more types of identifying data for the hardware module, including authentication information. Authentication information can include one or more authentication certificates comprising information applicable to one or more authentication processes. In some embodiments the one or more authentication certificates can be consistent with one or more certificate standards defining sequences, hash computations, or blockchain data points, one or more proprietary certification architectures, or a combination of both. In various embodiments, retrieving the authentication information may comprise reading one or more storage entries of the identification component configured to store the authentication information. The authentication information can be retrieved over the management interface communicatively connecting the management system and the identification component of the hardware module. In various embodiments, the hardware module may comprise a memory module and the identification component can comprise an SPD hub, similar to the system discussed with respect to FIG. 1.

After retrieving the authentication information, the management system can perform one or more authentication processes using the authentication information at operation 206. In various embodiments, the one or more authentication processes my comprise one or more standardized authentication processes, proprietary authentication processes, or a combination of both. The technology disclosed herein is applicable with any authentication process that may be performed using the authentication information maintained by the identification component of the hardware module.

If the authentication is deemed successful, the management system can generate a nonce key at operation 208. The nonce key can comprise a random value generated to identify the hardware module as an authenticated hardware module. In various embodiments, the length of the nonce key may be equivalent to the size of a register of a register array of the identification component on the hardware module. In some embodiments, the nonce key can comprise a 32-bit random value. A new nonce key can be generated each time an authentication process is applied using the authentication information of the identification component. At operation 210, the management system can write the nonce key to a nonce register of a register array associated with the identification component. The management system can write the nonce key to the nonce register through the identification component.

If the authentication process(es) fail, the management system can flag the hardware module as unauthenticated at operation 212. In various embodiments, the management system and/or other components of the computing platform can utilize the flag indicating a failed authentication in determining how to proceed. As a non-limiting example, the flag can cause the management system to not configure the hardware module. In other embodiments, the management system can indicate the failure based on the flag to a user or one or more other components of the computing platform. In some embodiments, the management system could configure the flagged hardware module within a sandbox-type environment to enable troubleshooting to occur within a secure environment isolated from the rest of the operating environment of the computing platform.

The method 200 can be performed for each hardware module of a plurality of hardware modules connected to the computing platform. In various embodiments, the method 200 can be executed during power on of the computing platform, and in some embodiments the method 200 can be performed while operating whenever a new hardware module is detected as being connected to the computing platform (e.g., a hot swappable hardware component). In various embodiments, the method 200 can be performed at periodic intervals during operation of the computing platform, generating new nonce keys for each successful authentication. Such periodic authentication can provide additional security in the event that a nonce key is intercepted in some manner by an attacker. In some embodiments, the method 200 can be performed at random intervals to further reduce the ability of an attacker to intercept the nonce key used for the secondary authentication when an access request is received.

Figure 3A:
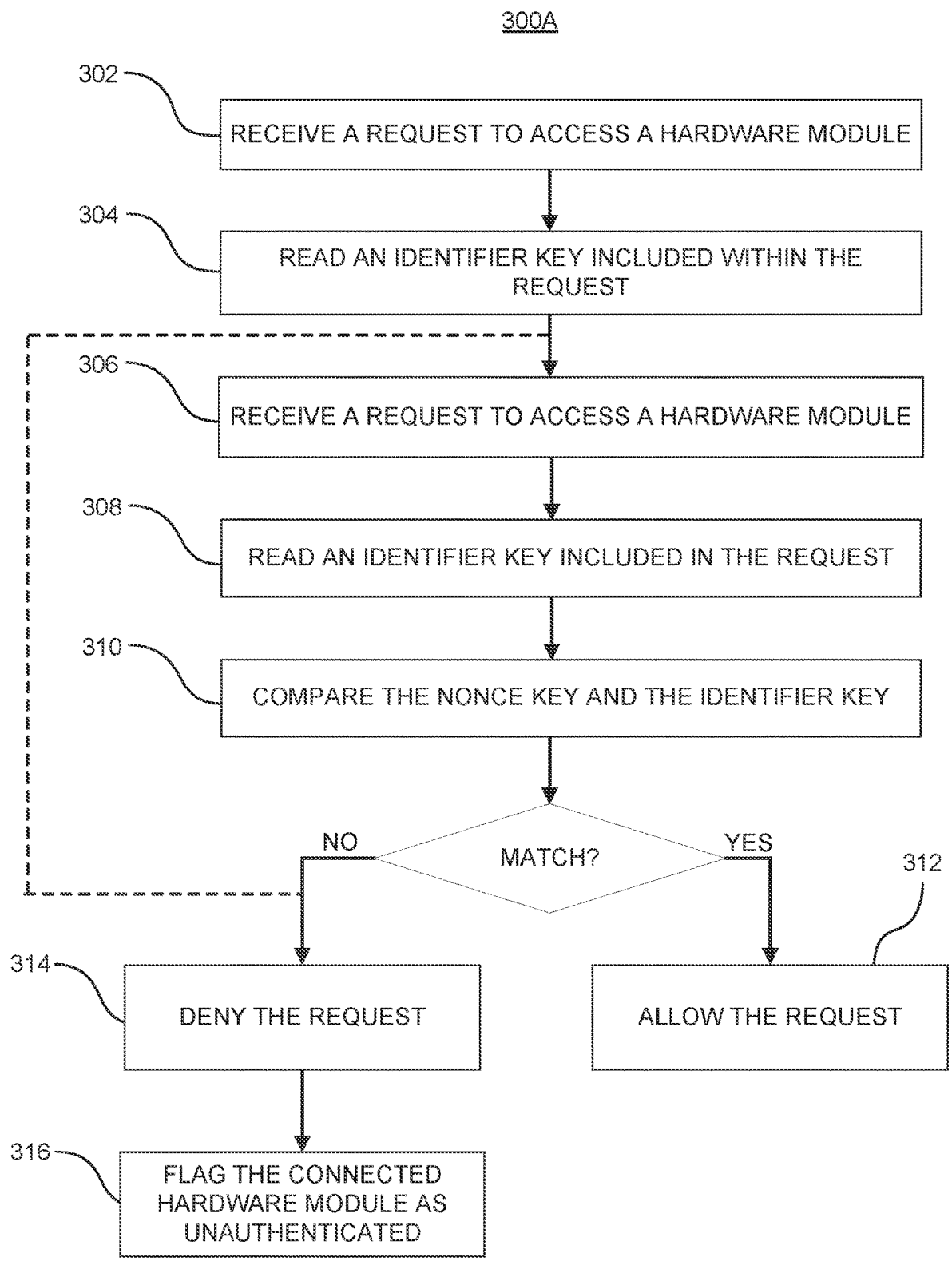
FIG. 3A is another method in accordance with embodiments of the technology disclosed herein.

FIG. 3A illustrates another example method 300A in accordance with the technology of the present disclosure. The example method 300A is provided for illustrative purposes only and should not be interpreted as limiting the scope of the technology to only the depicted embodiment. In various embodiments, the method 300A can be executed by a hardware module controller of a computing platform, similar to the memory controller 103 discussed with respect to FIG. 1. A hardware module controller can comprise one or more components of the computing platform 100 configured to control access and/or operation of the connected hardware module(s). In various embodiments, the method 300a can be embodied in one or more hardware components, or a combination of one or more hardware components and firmware of the one or more hardware components. For ease of discussion, the method 300A shall be discussed with respect to the computing platform 100 of FIG. 1, but the method 300A is applicable to other hardware module controllers of a computing platform 100. As shown in FIG. 3A, the memory controller can receive a request to access a hardware module at an address at operation 302. In various embodiments, the address included within the request may correspond to a memory address of a memory IC of the memory module. The request may be received from one or more of an application executing on the computing platform, a user of the computing platform, or a combination thereof in various embodiments.

At operation 304, the memory controller can read an identifier key included within the request. The identifier key can be a value included within the request that identifies the requested hardware module associated with the address in the request. In various embodiments, the identifier key can comprise the same length as an expected nonce key, like the nonce key discussed above with respect to FIGS. 1 and 2. At operation 306, the memory controller can read the nonce key from a nonce register of the connected hardware module at the address in the request. The address in the request is associated with a respective component slot of the computing platform. Therefore, when a request is received, the memory controller can read the nonce key of the hardware module currently connected to that component slot.

Once the identifier key and the nonce key are read, the memory controller can compare the two keys together to determine if they match at operation 308. Although the address included in the request results in the memory controller reading the nonce key of the currently connected hardware module, the identifier key is a value that is indicative of the authenticated hardware module that is expected to be associated with the address. In various embodiments, following authentication of a hardware component (e.g., a memory component) the management system can include an identifier key in the path information identifying the location of the hardware component. This identifier key is a copy of the nonce key generated following the successful authentication. When an application or other system entity seeks to access the hardware component, the path information used in addressing the request includes this identifier key. Comparing the identifier key in the request with the nonce key of the connected hardware module provides greater confidence that the hardware module actually being addressed is the same one that was authenticated for that address space. In one way, such a comparison can provide confidence where there is a difference in speed for the management interface and the memory interface (or data interface for other hardware modules). Regardless of the speeds of the interfaces, the comparison provides proof that the authentication process was successful and no tampering has occurred post-authentication.

If there is a match between the keys, the memory controller can allow the request for access by the application at operation 312. In various embodiments, allowing the request can comprise providing a copy of the data stored at the requested address to the application and/or user. If there is no match between the keys (or if there was no nonce value within the nonce register to be read by the memory controller), the memory controller can deny the request at operation

314. Where there is no nonce key, the memory controller can optionally skip reading operations 308 and 310 (as indicated by the broken line in FIG. 3A) and go from operation 306 directly to operation 314 (i.e., denying the request) because the lack of a nonce key is an indication the hardware module has not gone through an authentication process. At operation 316, the memory controller can flag the connected hardware module as being unauthenticated. In various embodiments, the flag can comprise an indication that can be transmitted to the application, the management system, other components of the computing platform, or a combination thereof. Identifying the unauthenticated hardware module can be an indication of a substitution-based attack, and the flag can be used to remediate the issue.

In various embodiments, the method 300A can occur for each access request received by the memory controller, while in other embodiments the method 300A can occur when the time between access requests for the connected hardware module accessible at one or more addresses in an access request exceeds a certain threshold. If the memory controller had recently verified that the connected hardware module is the authenticated hardware module, the memory controller may be able to rely on that information if access to the same connected hardware module is received quickly thereafter. In various embodiments, the threshold may be determined based on a number of clock cycles since the last attempt to access that connected hardware component, while in other embodiments the threshold may be based on an expected time to remove and replace a hardware module within the computing platform.

In various embodiments, the management system may be configured to execute the method 300A. In such embodiments, the memory controller may identify the identifier key in a request to access and send the identifier key to the management system. Upon receipt of the identifier key, the management system can access the nonce register of a connected hardware module at the requested address and perform the comparison.

Figure 3B:
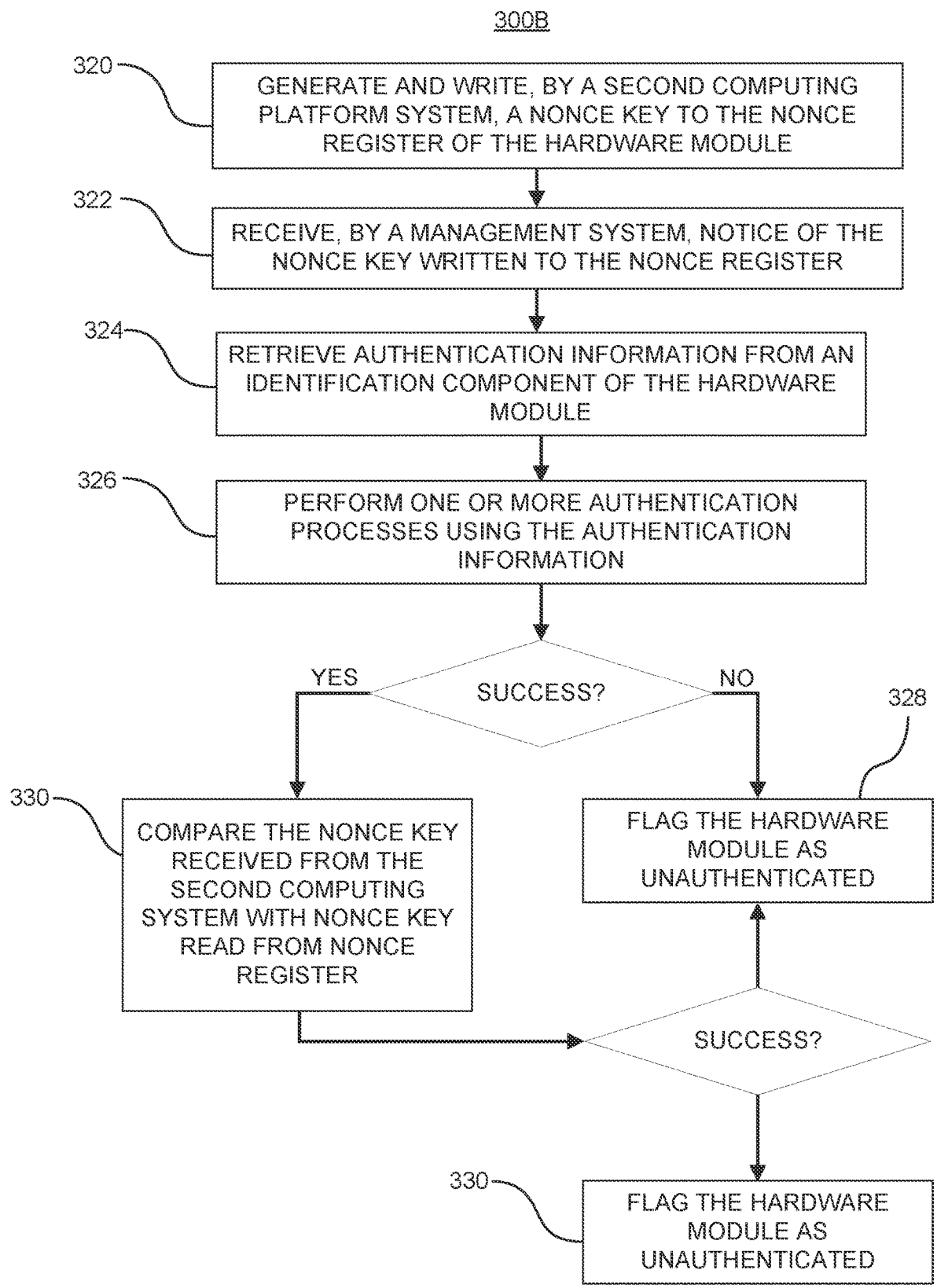
FIG. 3B is another method in accordance with embodiments of the technology disclosed herein.

In some embodiments, the management system may perform the secondary authentication, similar to the method 300A of FIG. 3A. FIG. 3B illustrates another example method 300B in accordance with embodiments of the technology disclosed herein. The example method 300B is provided for illustrative purposes only and should not be interpreted as limiting the scope of the technology only to the depicted embodiment. As shown in FIG. 3B, a second computing platform system can generate and write the nonce key to the nonce register of the hardware module at operation 320. Non-limiting examples of second computing platform systems that may generate and write the nonce key to the hardware module include the computing platform BIOS, system firmware, or one or more device drivers, among others. In various embodiments, the second computing platform systems may be communicatively coupled to the hardware module over an interface, including but not limited to a data interface (e.g., the memory interface 107 of FIG. 1). In various embodiments, the second computing platform application can be configured to access the nonce register of the hardware module before one or more authentication processes are performed by the management system, while in other embodiments the second computing platform may be configured to perform the one or more authentication processes.

At operation 322, the management system can receive from the second computing platform system notice of the nonce key generated and written to the nonce register. In various embodiments, the second computing platform system may inform the management system over a computing platform interface, such as the controller management interface 109 or the management interface 106 discussed with respect to FIG. 1. After being informed of the nonce key, the management system can retrieve authentication information from an identification component of the hardware module at operation 324, and perform one or more authentication processes using the authentication information at operation 326. The operations 324 and 326 can be performed in a similar manner as operations 204 and 206 discussed with respect to FIG. 2. If the authentication at operation 326 is not successful, the hardware module can be flagged as unauthentic at operation 328, similar to operation 212 discussed with respect to FIG. 2. If the authentication processes are successful at operation 326, the management system can compare the received nonce key from the second computing platform system with the nonce key read from the nonce register of the hardware module at operation 330. In this way, the management system can perform a secondary authentication that the hardware module is the proper hardware module. If the nonce keys do not match, the hardware module can be flagged as unauthentic at operation 328. If the nonce keys do match, the management system can flag the hardware module as authentic at operation 332.

Figure 4:
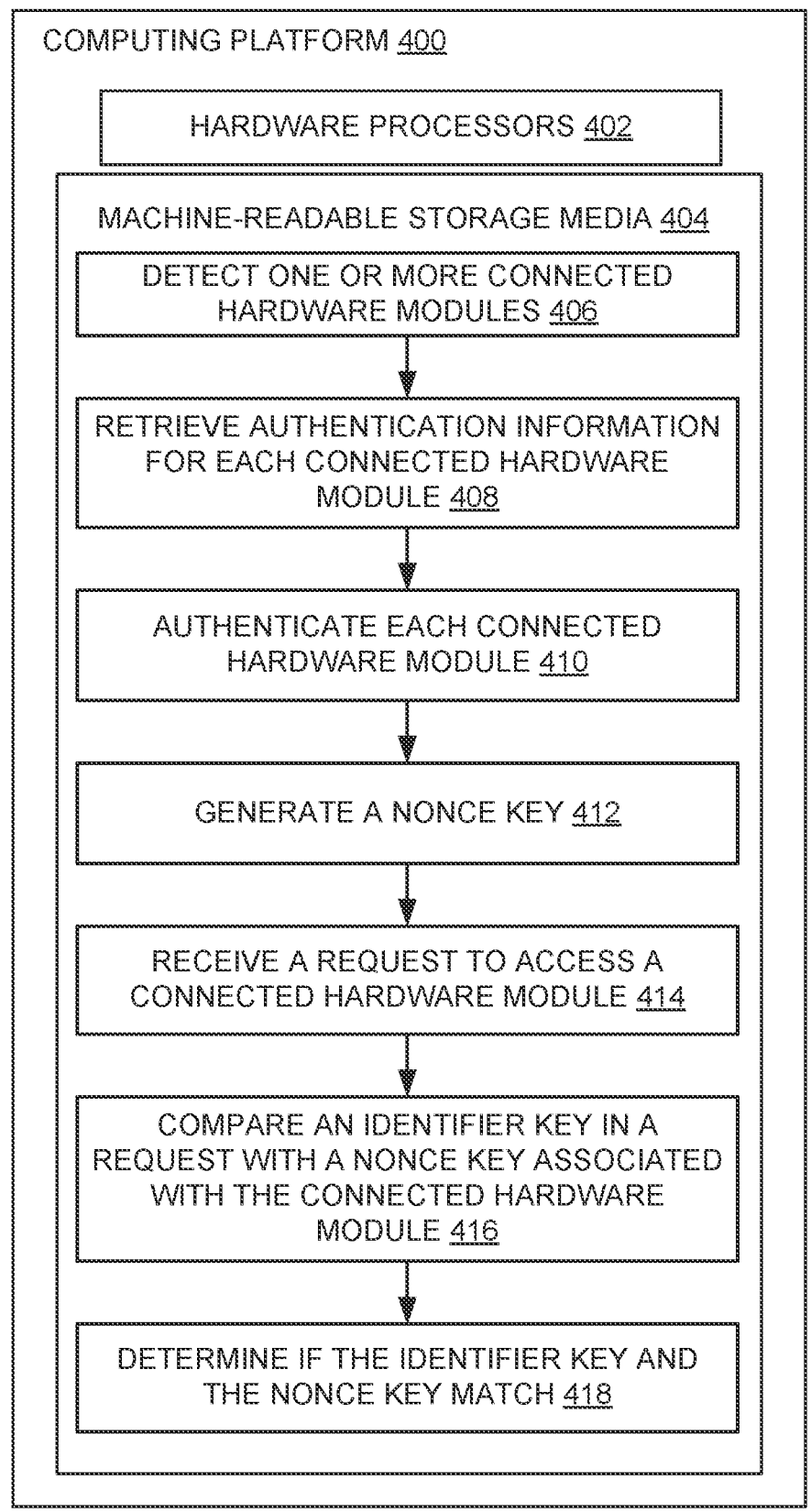
FIG. 4 is an example of a computing platform storing instructions on a machine-readable storage media in accordance with embodiments of the technology disclosed herein.

FIG. 4 is an example computing platform 400 in accordance with embodiments of the present disclosure. Where operations and functionality of computing platform 400 are similar to those discussed with respect to FIGS. 1-3, the description should be interpreted to apply. In various embodiments, the computing platform 400 may be similar to the computing platform 100 discussed with respect to FIGS. 1-3. The computing platform 400 includes hardware processors 402. In various embodiments, hardware processors 402 can comprise the management system 102 and/or the memory controller 103 discussed with respect to FIGS. 1-3. In some embodiments, the hardware processors 402 can comprise one or more hardware module controllers configured to control access and/or control of other types of hardware modules of the computing platform 400.

Hardware processors 402 are configured to execute instructions stored on a machine-readable medium 404. Machine readable medium 404 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. In various embodiments, the machine readable medium 404 can be similar to the non-transitory machine-readable storage medium discussed with respect to FIGS. 2 and 3. The instructions stored on the machine-readable medium 404 may include various sub-instructions for performing the function embodied by the identified functions. For example, the instructions "detect one or more connected hardware modules" 406 may include various sub-instructions for detecting connected hardware components over one or more communication buses of the computing platform in a manner similar to that discussed above with respect to FIGS. 1-4. The instruction 406 may further include sub-instructions to detect connected modules using one or more standardized detection protocols known in the art.

The instruction "retrieve authentication information for each connected hardware module" 408 may include various sub-instructions for accessing authentication information stored on the connected hardware module in a manner similar to that discussed with respect to FIGS. 1-4 above. Retrieving the information can occur over a management interface between a hardware module and a management system of the computing platform. In various embodiments, the instruction 408 may include sub-instructions for accessing authentication information maintained in an identification component of the hardware module. In various embodiments, the identification component can comprise an SPD hub of a memory module.

The instruction "authenticate each hardware module" 410 can include various sub-instructions for performing one or more authentication processes in a manner similar to that discussed above with respect to FIGS. 1-4. The instruction "generate a nonce key" 412 may include various sub-instructions for performing a random value generation in a manner similar to that discussed above with respect to FIGS. 1-4. In various embodiments, the instruction 412 may further include sub-instructions for writing the generated nonce key to a nonce register of a register array of the hardware module. The instruction 412 may further include instructions to write the generated nonce key over a management interface via the identification component.

The instruction "receive a request to access a connected hardware module" 414 may include various sub-instructions for receiving a request from an application or user of the computing platform in a manner similar to that discussed above with respect to FIGS. 1-4. The instruction "compare an identifier key in a request with a nonce key associated with the connected hardware module" 416 may include various sub-instructions for reading and/or retrieving the identifier key from an access request and a nonce key within a nonce register of a hardware component accessible at the address in the request in a manner similar to that discussed with respect to FIGS. 1-4. In various embodiments, the instruction 416 may further include sub-instructions to identify the identifier key within the request. The instruction 416 may include sub-instructions for transmitting the identifier key to a management system of the computing platform.

The instruction "determine if the identifier key and the nonce key match" 418 can include various sub-instructions for identifying the result of the comparison of the identifier key and the nonce key from instruction 418 in a manner similar to that discussed above with respect to FIGS. 1-4. In various embodiments, the instruction 418 may further include one or more sub-instructions for allowing the application and/or user to access the requested memory address if the identifier key and the nonce key match, thereby determining that the connected hardware module is the same hardware module that was authenticated previously. The instruction 418 can include sub-instructions for flagging the connected hardware module as an unauthenticated hardware module and send the flag indication to one or more other components of the computing platform in a manner similar to that discussed above with respect to FIGS. 1-4.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.]

Figure 5:
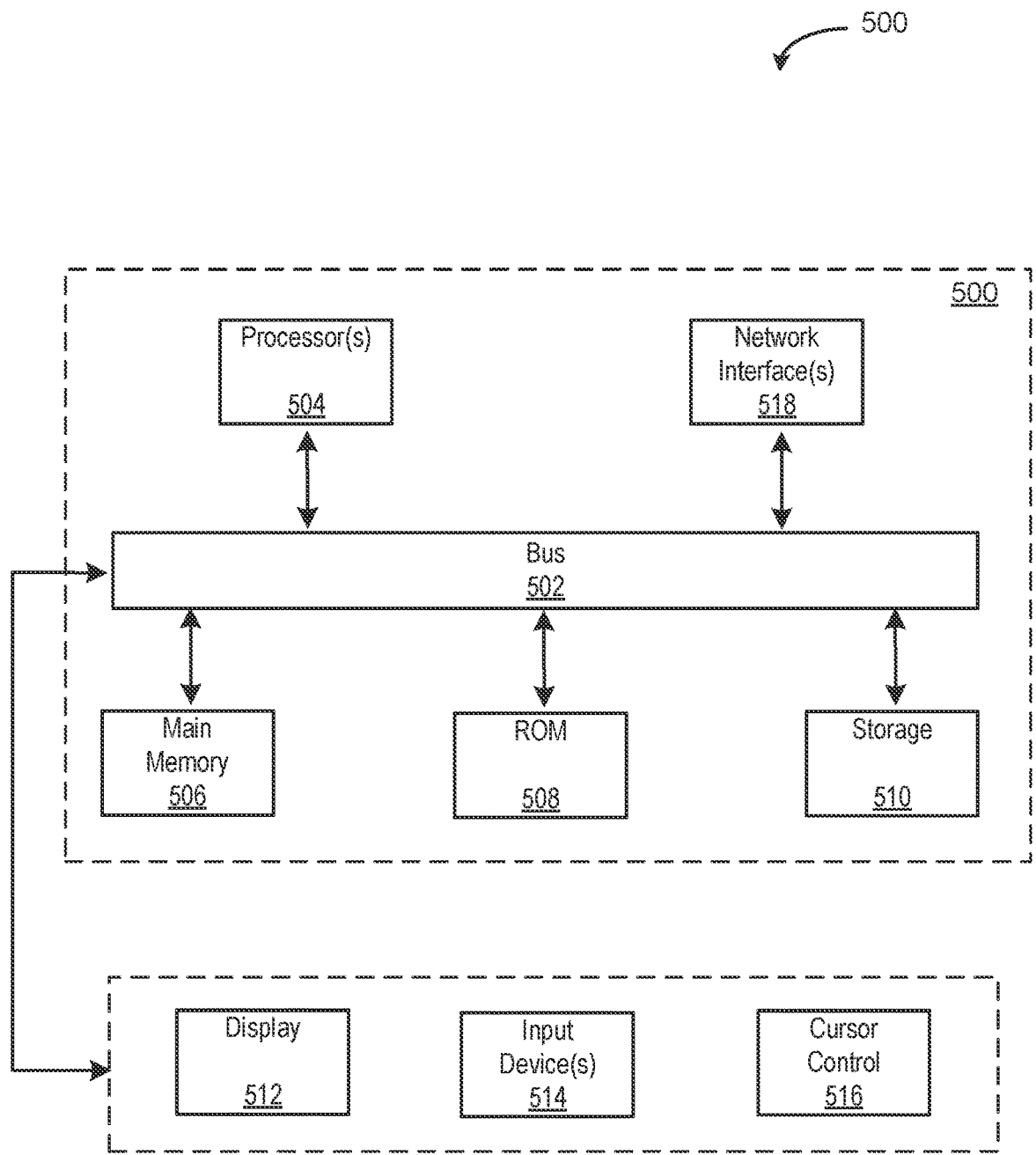
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium comprising instructions that upon execution cause a computing platform to:
perform, by a management controller of the computing platform, a first authentication of a hardware module in the computing platform over a management interface;
in response to the first authentication being successful, write, by the management controller over the management interface, a key based on a random value to a register of an identification component of the hardware module, the register in the hardware module being accessible over the management interface and over a data interface separate from the management interface, wherein the key provides a unique identifier for the hardware module;
receive, at a hardware module controller of the computing platform, a request to access the hardware module from a program executing on the computing platform, wherein the request is to access the hardware module over the data interface;
read, by the hardware module controller as part of performing a second authentication, the key from the register of the hardware module over the data interface;
compare, by the hardware module controller, the key from the register to an identifier key included in the request;
in response to the identifier key matching the key from the register:
determine, by the hardware module controller, that the hardware module is authenticated as part of the second authentication over the data interface, and
allow, by the hardware module controller, the program to access the hardware module over the data interface.

2. The non-transitory machine-readable storage medium of claim 1, wherein the instructions upon execution cause the computing platform to:
in response to the identifier key not matching the key from the register, determine, by the hardware module controller, that the hardware module at an address included in the request is not an authenticated hardware module.

3. The non-transitory machine-readable storage medium of claim 2, wherein the instructions upon execution cause the computing platform to:
flag the hardware module at the address included in the request as a non-authenticated hardware module.

4. The non-transitory machine-readable storage medium of claim 1, wherein the hardware module comprises a memory module, and the hardware module controller comprises a memory controller.

5. The non-transitory machine-readable storage medium of claim 1, wherein the identifier key matching the key from the register indicates that the hardware module accessed by the request is the same component as the hardware module authenticated by the management controller in the first authentication.

6. The non-transitory machine-readable storage medium of claim 1, wherein the random value of the key is generated by the management controller.

7. The non-transitory machine-readable storage medium of claim 1, wherein the instructions upon execution cause the computing platform to:
reauthenticate, by the management controller, the hardware module while the computing platform is operating;
generate, by the management controller, a new key as part of the reauthenticating; and
write, by the management controller, the new key to the register of the hardware module over the management interface.

8. A method comprising:
performing, by a management controller, a first authentication of an identification component of a hardware module over a management interface, the hardware module connected to a computing platform;
in response to the first authentication being successful, writing, by the management controller over the management interface, a key based on a random value to a register of the identification component of the hardware module, the register in the hardware module being accessible over the management interface and over a data interface separate from the management interface, wherein the key provides a unique identifier for the hardware module;
receiving, at a hardware module controller from a program executing on the computing platform, a request to access the hardware module, the request including an identifier key identifying the hardware module and an address to access, wherein the request is to access the hardware module over the data interface;
reading, by the hardware module controller as part of performing a second authentication, the key from the register of the hardware module over the data interface;
comparing, by the hardware module controller, the key from the register of the hardware module to the identifier key in the request;
in response to the identifier key matching the key from the register:
determining, by the hardware module controller, that the hardware module is authenticated as part of the second authentication over the data interface, and
allowing, by the hardware module controller, access to the hardware module at the address in the request.

9. The method of claim 8, comprising:
in response to the identifier key not matching the key, determining, by the hardware module controller, that the hardware module at the address included in the request is not an authenticated hardware module.

10. The method of claim 9, further comprising flagging, by the hardware module controller, the hardware module at the address included in the request as a non-authenticated module.

11. The method of claim 8, wherein the hardware module controller is a memory controller of the computing platform, and the hardware module is a memory module.

12. The method of claim 11, wherein the identification component comprises a serial presence detect (SPD) hub of the memory module, the SPD hub comprising authentication information accessed by the management controller in the first authentication.

13. The method of claim 11, wherein the data interface is a memory interface.

14. The method of claim 8, wherein the identifier key matching the key from the register indicates that the hardware module accessed by the request is the same component as the hardware module authenticated by the management controller in the first authentication.

15. The method of claim 8, further comprising:
reauthenticating, by the management controller, the hardware module while the computing platform is operating;
generating, by the management controller, a new key as part of the reauthenticating; and
writing, by the management controller, the new key to the register of the hardware module over the management interface.

16. The method of claim 8, wherein the identifier key comprises a random value.

17. A computing platform comprising:
a hardware module comprising a register;
a management controller to:
  perform a first authentication of the hardware module over a management interface, and
  in response to the first authentication being successful, write, over the management interface, a key based on a random value to the register of the hardware module, the register in the hardware module being accessible over the management interface and over a data interface separate from the management interface, wherein the key provides a unique identifier for the hardware module; and
a hardware module controller to control access of the hardware module over the data interface, the hardware module controller to:
  receive, from a program executing in the computing platform, a request to access the hardware module, the request including an identifier key identifying the hardware module and an address to access, wherein the request is to access the hardware module over the data interface,
  read, as part of performing a second authentication by the hardware module controller, the key from the register of the hardware module over the data interface,
  compare the key from the register of the hardware module to the identifier key in the request,
  in response to the identifier key matching the key from the register:
    determine that the hardware module is authenticated as part of the second authentication over the data interface, and
    allow, by the hardware module controller, access to the hardware module at the address in the request.

18. The computing platform of claim 17, wherein the management controller is to further:
reauthenticate the hardware module while the computing platform is operating;
generate a new key as part of the reauthenticating; and
write the new key to the register of the hardware module over the management interface.

19. The computing platform of claim 17, wherein the hardware module controller is a memory controller of the computing platform, and the hardware module is a memory module.

20. The computing platform of claim 19, wherein the memory module comprises a serial presence detect (SPD) hub, the SPD hub comprising authentication information accessed by the management controller in the first authentication.

* * * * *